United States Patent
Lee et al.

(10) Patent No.: US 8,868,092 B2
(45) Date of Patent: Oct. 21, 2014

(54) METHOD AND APPARATUS FOR TRANSMITTING DATA IN WIRELESS COMMUNICATION SYSTEM

(75) Inventors: Jin Lee, Anyang-si (KR); Young Soo Yuk, Anyang-si (KR); Gi Won Park, Anyang-si (KR); Jeong Ki Kim, Anyang-si (KR); Ki Seon Ryu, Anyang-si (KR)

(73) Assignee: LG Electronics Inc., Seoul (KR)

(*) Notice: Subject to any disclaimer, the term of this patent is extended or adjusted under 35 U.S.C. 154(b) by 154 days.

(21) Appl. No.: 13/416,758

(22) Filed: Mar. 9, 2012

(65) Prior Publication Data

US 2012/0322457 A1    Dec. 20, 2012

Related U.S. Application Data

(60) Provisional application No. 61/497,494, filed on Jun. 15, 2011, provisional application No. 61/500,626, filed on Jun. 24, 2011, provisional application No. 61/501,791, filed on Jun. 28, 2011.

(30) Foreign Application Priority Data

Jan. 13, 2012  (KR) .......................... 10-2012-0004354

(51) Int. Cl.
H04W 72/04 (2009.01)

(52) U.S. Cl.
USPC ........ 455/452.1; 455/466; 455/438; 455/445; 455/418; 455/558; 370/210; 370/313; 370/335; 370/338; 370/341

(58) Field of Classification Search
USPC ............. 455/452.1, 466, 436–438, 517, 418, 455/558, 445; 370/328–331, 335, 313, 341, 370/210
See application file for complete search history.

(56) References Cited

U.S. PATENT DOCUMENTS 8,280,417 B2 * 10/2012 Venkatachalam et al. .... 455/466
2009/0323634 A1 * 12/2009 Kim et al. ..................... 370/331

FOREIGN PATENT DOCUMENTS

EP       2309800        4/2011

OTHER PUBLICATIONS

Lee et al. "Small data transmission for idle mode M2M device in wirelessMAN OFDMA system", IEEE 802.16 Broadband wireless access working group, May 17, 2011, pp. 1-3, XP002685932.
Li et al., "M2M Short message serices in 16e", IEEE 802.16 broadband wireless access working group, May 8, 2011, XP-002685931.

* cited by examiner

Primary Examiner — Michael T Vu
(74) Attorney, Agent, or Firm — McKenna Long & Alridge LLP

(57) ABSTRACT

A method of transmitting data in a wireless communication system is provided. A machine-to-machine (M2M) device transmits a first ranging request message including a M2M short message service (SMS) request indicating that the M2M device has a M2M SMS to transmit, and receives a first ranging response message including a M2M SMS response, a basic connection identifier (CID) and a temporary CID timer. If the M2M SMS request is accepted by a base station, the M2M device transmits a second ranging request message including the M2M SMS based on the basic CID, and receives a second ranging response message including a M2M SMS confirmation indicating whether the reception of the M2M SMS is successful or not by the base station.

7 Claims, 13 Drawing Sheets

METHOD AND APPARATUS FOR TRANSMITTING DATA IN WIRELESS COMMUNICATION SYSTEM

CROSS-REFERENCE TO RELATED APPLICATIONS

This application claims the benefit of priority of U.S. Provisional application No. 61/497,494 filed on Jun. 15, 2011, U.S. Provisional application No. 61/500,626 filed on Jun. 24, 2011, U.S. Provisional application No. 61/501,791 filed on Jun. 28, 2011, and Korean Patent application No. 10-2012-0004354 filed on Jan. 13, 2012, all of which are incorporated by reference in their entirety herein.

BACKGROUND OF THE INVENTION

1. Field of the Invention

The present invention relates to wireless communications, and more particularly, to a method and apparatus for transmitting data in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., 4th generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

There is ongoing development on the institute of electrical and electronics engineers (IEEE) 802.16p standard optimized for machine-to-machine (M2M) communication based on the IEEE 802.16e standard and the IEEE 802.16m standard. The M2M communication can be defined as an information exchange performed between a subscriber station and a server or between subscriber stations in a core network without any human interaction. In the IEEE 802.16p standard, there is an ongoing discussion on enhancement of medium access control (MAC) of the IEEE 802.16 standard and a minimum change of an orthogonal frequency division multiple access (OFDMA) physical layer (PHY) in licensed bands. Due to the discussion on the IEEE 802.16p standard, a wide area wireless coverage is required in the licensed band, and a scope of applying automated M2M communication can be increased for an observation and control purpose.

When accessing a network, requirements demanded by many M2M applications are significantly different from requirements for human-initiated or human-controlled network access. The M2M application can include vehicular telematics, healthcare monitoring of bio-sensors, remote maintenance and control, smart metering, an automated service of a consumer device, etc. The requirements of the M2M application can include very lower power consumption, larger numbers of devices, short burst transmission, device tampering detection and reporting, improved device authentication, etc.

Similarly to the IEEE 802.16m standard, the IEEE 802.16p standard can also support transmission of a short message service (SMS). The M2M device is characterized in short burst transmission, and thus effective SMS transmission of the M2M device is required. In addition, since it is expected that the M2M device primarily operates in an idle mode, there is a need for an effective method for transmitting the SMS while decreasing a signaling overhead in the idle mode.

SUMMARY OF THE INVENTION

The present invention provides a method and apparatus for data transmission. In particular, the present invention provides a method of effectively transmitting a short message service (SMS) by a machine-to-machine (M2M) device in an idle mode.

In an aspect, a method of transmitting data by a machine-to-machine (M2M) device in a wireless communication system is provided. The method includes transmitting a first ranging request message to a base station, the first ranging request message including a M2M short message service (SMS) request indicating that the M2M device has a M2M SMS to transmit, receiving a first ranging response message from the base station, the first ranging response message including a M2M SMS response, a basic connection identifier (CID) and a temporary CID timer, the M2M SMS response being correspond to the M2M SMS request and informing the M2M device whether the M2M SMS request is accepted or not, the basic CID and the temporary CID timer being used for resource allocation, transmitting a second ranging request message to the base station if the M2M SMS request is accepted by the base station, the second ranging request message including the M2M SMS based on the basic CID, and receiving a second ranging response message from the base station, the second ranging response message including a M2M SMS confirmation indicating whether the reception of the M2M SMS is successful or not by the base station.

The temporary CID timer may indicate a life time duration of the basic CID.

The temporary CID timer may start when the M2M device receives the first ranging response message.

The basic CID may be released after the second ranging response message is received, or if the temporary CID timer expires.

The M2M SMS request may indicate the number of bytes of the M2M SMS.

The M2M SMS may be transmitted based on a service flow which is retained in idle mode.

The service flow may be retained based on an idle mode retain preference parameter defined when the service flow is created.

A value of the idle mode retain preference parameter may be 1.

The first ranging response message may include a temporary transport CID and a CID update type-length-value (TLV), the CID update TLV indicating information on mapping between the service flow and the temporary transport CID.

In another aspect, a method of transmitting data by a machine-to-machine (M2M) device in a wireless communication system is provided. The method includes receiving a broadcast paging message from a base station, an action code of the broadcast paging message indicating location update, receiving a ranging response message from the base station, the ranging response message including the M2M SMS, a basic connection identifier (CID) and a temporary CID timer, the basic CID and the temporary CID timer being used for resource allocation, and transmitting a ranging request message to the base station, the ranging request message including a M2M SMS confirmation indicating whether the M2M SMS is successfully received or not by the M2M device.

The temporary CID timer may indicate a life time duration of the basic CID.

The temporary CID timer may start when the M2M device receives the ranging response message.

The basic CID may be released after the second ranging request message is transmitted, or if the temporary CID timer expires.

In another aspect, a machine-to-machine (M2M) device in a wireless communication system is provided. The M2M device includes a radio frequency (RF) unit for transmitting or receiving a radio signal, and a processor, coupled to the RF unit, and configured for transmitting a first ranging request message to a base station, the first ranging request message including a M2M short message service (SMS) request indicating that the M2M device has a M2M SMS to transmit, receiving a first ranging response message from the base station, the first ranging response message including a M2M SMS response, a basic connection identifier (CID) and a temporary CID timer, the M2M SMS response being correspond to the M2M SMS request and informing the M2M device whether the M2M SMS request is accepted or not, the basic CID and the temporary CID timer being used for resource allocation, transmitting a second ranging request message to the base station if the M2M SMS request is accepted by the base station, the second ranging request message including the M2M SMS based on the basic CID, and receiving a second ranging response message from the base station, the second ranging response message including a M2M SMS confirmation indicating whether the reception of the M2M SMS is successful or not by the base station.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11(Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.16m is chiefly described as an example in order to clarify the description, but the technical spirit of the present invention is not limited to IEEE 802.16m.

Figure 1:
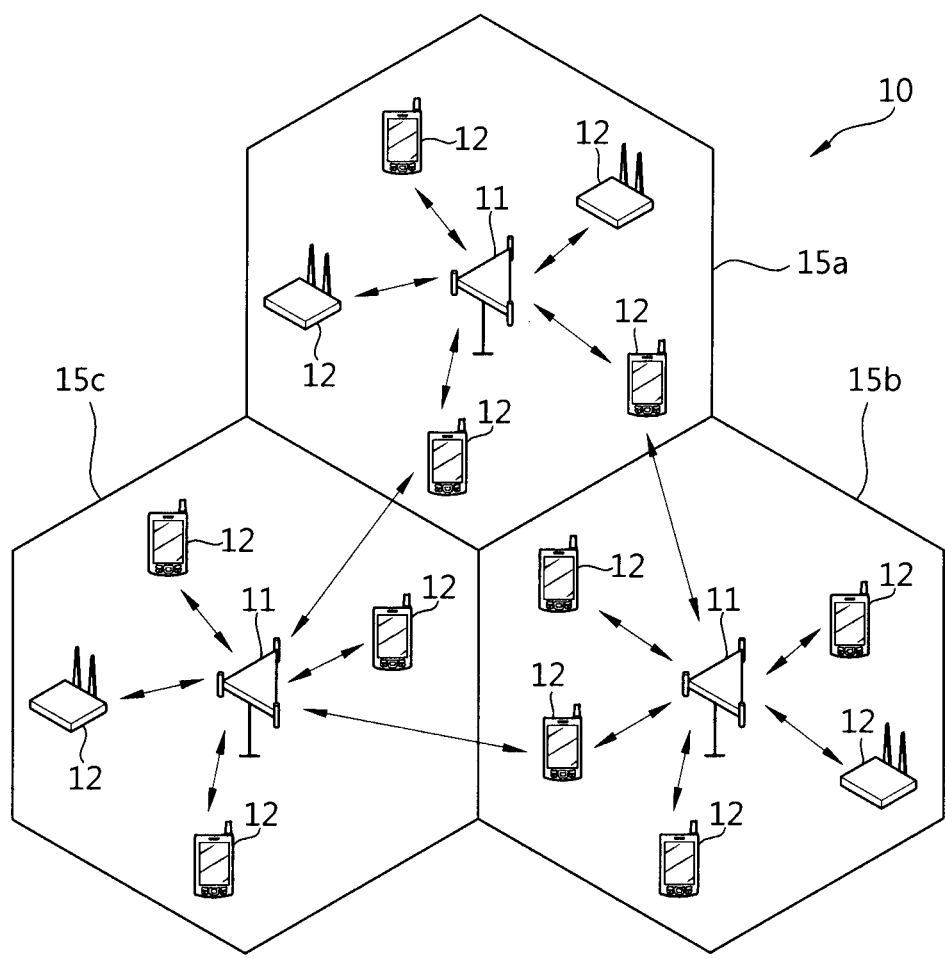
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
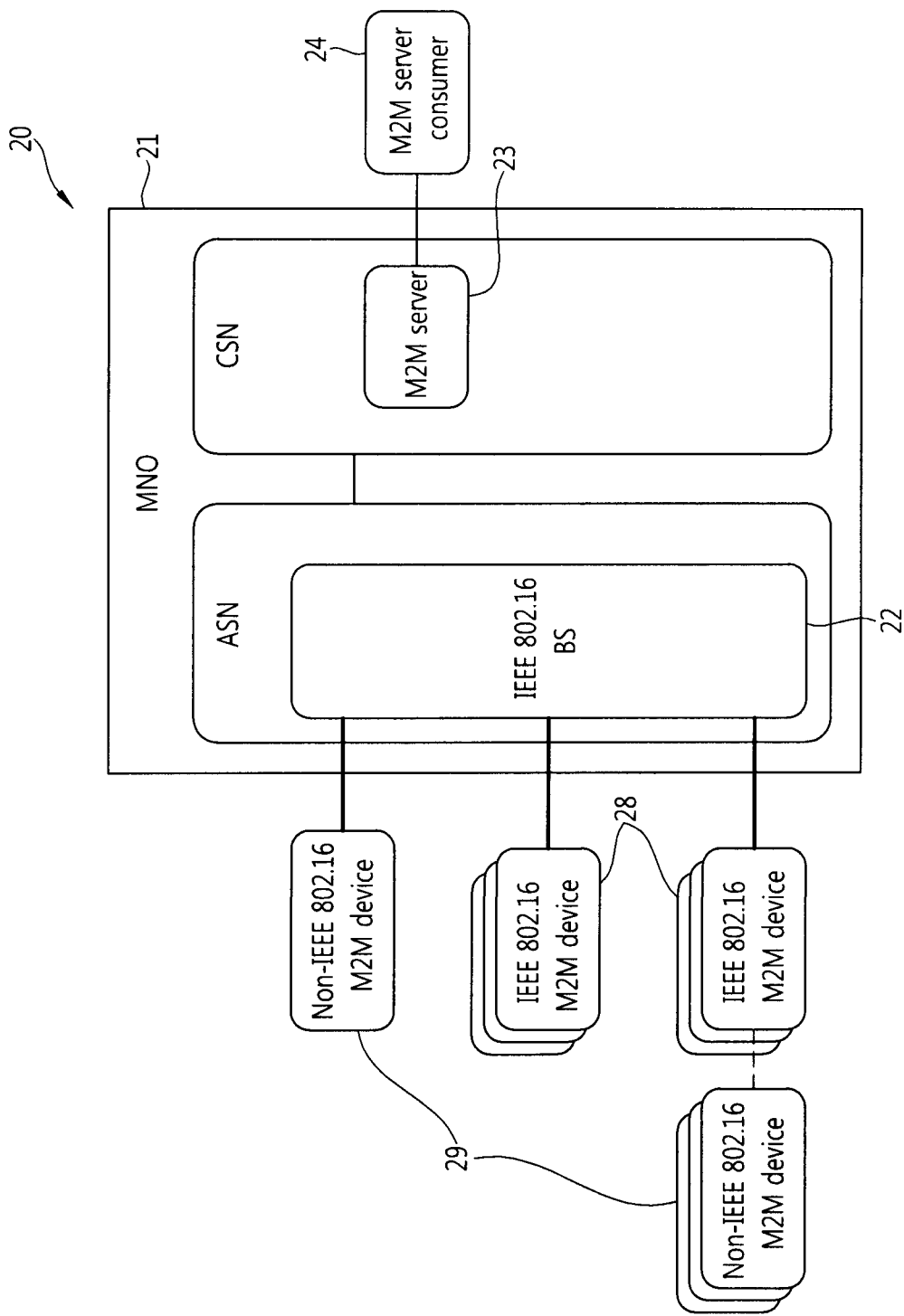
FIG. 2 shows basic M2M service system architecture.
Figure 3:
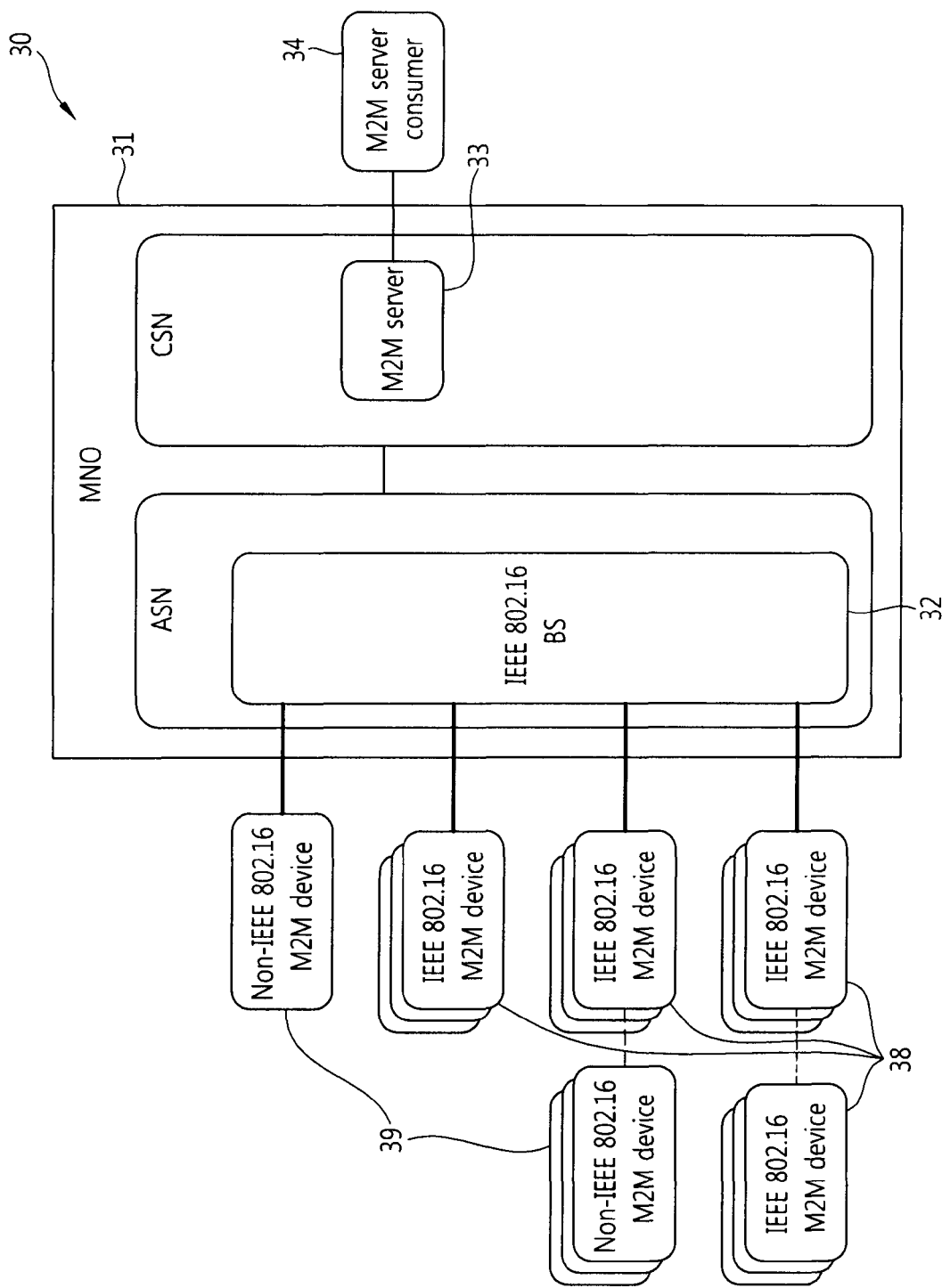
FIG. 3 shows advanced M2M service system architecture.

FIG. 2 and FIG. 3 show an example of system architecture of IEEE 802.16 supporting machine-to-machine (M2M) communication.

FIG. 2 shows basic M2M service system architecture. A basic M2M service system architecture 20 includes a mobile network operator (MNO) 21, a M2M service consumer 24, at least one IEEE 802.16 M2M device (hereinafter, 802.16 M2M device) 28, and at least one non-IEEE 802.16 M2M device 29. The MNO 21 includes an access service network (ASN) and a connectivity service network (CSN). The 802.16 M2M device 28 is an IEEE 802.16 mobile station (MS) having a M2M functionality. A M2M server 23 is an entity for communicating with one or more 802.16 M2M devices 28. The M2M server 23 has an interface accessibly by the M2M service consumer 24. The M2M service consumer 24 is a user of a M2M service. The M2M server 23 may be located inside or outside the CSN, and can provide a specific M2M service to the one or more 802.16 M2M devices 28. The ASN may include an IEEE 802.16 base station (BS) 22. A M2M application operates based on the 802.16 M2M device 28 and the M2M server 23.

The basic M2M service system architecture 20 supports two types of M2M communication, i.e., M2M communication between one or more 802.16 M2M devices and a M2M server or point-to-multipoint communication between the 802.16 M2M devices and an IEEE 802.16 BS. The basic M2M service system architecture of FIG. 2 allows the 802.16 M2M device to operate as an aggregation point for a non-IEEE 802.16 M2M device. The non-IEEE 802.16 M2M device uses a radio interface different from IEEE 802.16 such as IEEE 802.11, IEEE 802.15, PLC, or the like. In this case, the non-IEEE 802.16 M2M device is not allowed to change the radio interface to IEEE 802.16.

FIG. 3 shows advanced M2M service system architecture. In the advanced M2M service system architecture, an 802.16 M2M device can operate as an aggregation point for a non-IEEE 802.16 M2M device, and also can operate as an aggregation point for an 802.16 M2M device. In this case, in order to perform an aggregation function for the 802.16 M2M device and the non-802.16 M2M device, the radio interface can be changed to IEEE 802.16. In addition, the advanced M2M service system architecture can support a peer-to-peer (P2P) connection between 802.16 M2M devices. In this case, the P2P connection can be established on either IEEE 802.16 or another radio interface such as IEEE 802.11, IEEE 802.15, PLC, or the like.

Hereinafter, IEEE 802.16e and IEEE 802.16m frame structures will be described.

Figure 4:
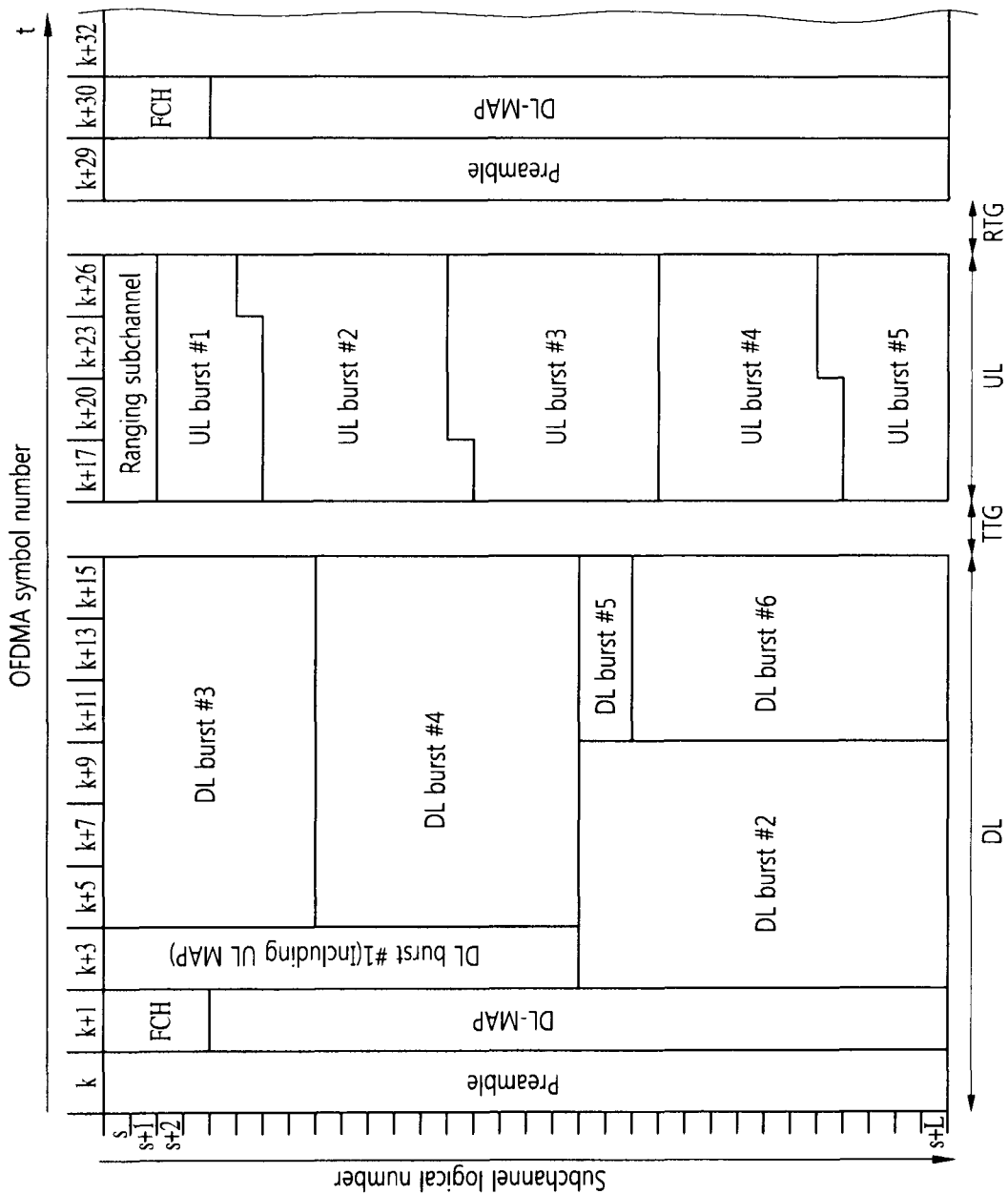
FIG. 4 shows an example of an IEEE 802.16e frame structure.

FIG. 4 shows an example of an IEEE 802.16e frame structure.

A time division duplex (TDD) frame structure of IEEE 802.16e is shown in FIG. 4. The TDD frame includes a downlink (DL) transmission period and an uplink (UL) transmission period. The DL transmission period temporally precedes the UL transmission period. The DL transmission period sequentially includes a preamble, a frame control header (FCH), a DL-MAP, a UL-MAP, and a DL burst region. The UL transmission period includes a ranging subchannel and a UL burst region. A guard time for identifying the UL transmission period and the DL transmission period is inserted to a middle portion (between the DL transmission period and the UL transmission period) and a last portion (next to the UL transmission period) of the frame. A transmit/receive transition gap (TTG) is a gap between a DL burst and a subsequent UL burst. A receive/transmit transition gap (RTG) is a gap between a UL burst and a subsequent DL burst.

A preamble is used between a BS and an MS for initial synchronization, cell search, and frequency-offset and channel estimation. The FCH includes information on a length of a DL-MAP message and a coding scheme of the DL-MAP. The DL-MAP is a region for transmitting the DL-MAP message. The DL-MAP message defines access to a DL channel. This implies that the DL-MAP message defines DL channel indication and/or control information. The DL-MAP message includes a configuration change count of a downlink channel descriptor (DCD) and a BS identifier (ID). The DCD describes a DL burst profile applied to a current MAP. The DL burst profile indicates characteristics of a DL physical channel. The DCD is periodically transmitted by the BS by using a DCD message. The UL-MAP is a region for transmitting a UL-MAP message. The UL-MAP message defines access to a UL channel. This implies that the UL-MAP message defines UL channel indication and/or control information. The UL-MAP message includes a configuration change count of an uplink channel descriptor (UCD) and also includes an effective start time of UL allocation defined by the UL-MAP. The UCD describes a UL burst profile. The UL burst profile indicates characteristics of a UL physical channel. The UCD is periodically transmitted by the BS by using a UCD message. The DL burst is a region for transmitting data sent by the BS to the MS. The UL burst is a region for transmitting data sent by the MS to the BS. The fast feedback region is included in a UL burst region of a frame. The fast feedback region is used to transmit information that requires a fast response from the BS. The fast feedback region can be used for CQI transmission. A location of the fast feedback region is determined by the UL-MAP. The location of the fast feedback region may be a fixed location in the frame, or may be a variable location.

Figure 5:
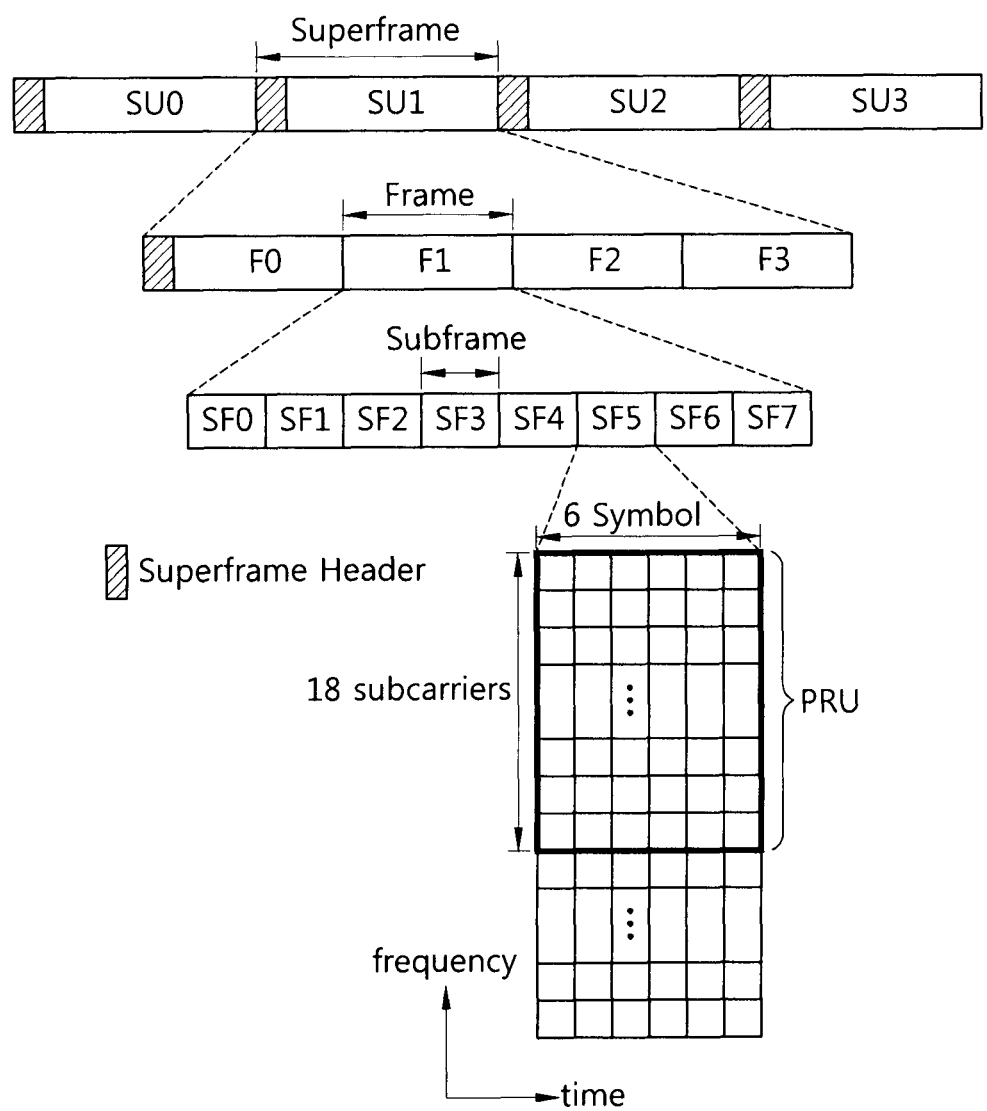
FIG. 5 shows an example of an IEEE 802.16m frame structure.

FIG. 5 shows an example of an IEEE 802.16m frame structure.

Referring to FIG. 5, a superframe (SF) includes a superframe header (SFH) and four frames F0, F1, F2, and F3. Each frame may have the same length in the SF. Although it is shown that each SF has a size of 20 milliseconds (ms) and each frame has a size of 5 ms, the present invention is not limited thereto. A length of the SF, the number of frames included in the SF, the number of SFs included in the frame, or the like may change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for UL or DL transmission. One subframe includes a plurality of orthogonal frequency division multiplexing (OFDM) symbols or orthogonal frequency division multiple access (OFDMA) symbols in a time domain, and includes a plurality of subcarriers in a frequency domain. An OFDM symbol is for representing one symbol period, and can be referred to as other terminologies such as an OFDMA symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplex (TDD) or frequency division duplex (FDD) can be applied to the frame. In the TDD, each subframe is used in UL or DL transmission at the same frequency and at a different time. That is, subframes included in a TDD frame are divided into a UL subframe and a DL subframe in the time domain. In the FDD, each subframe is used in UL or DL transmission at the same time and at a different frequency.

That is, subframes included in an FDD frame are divided into a UL subframe and a DL subframe in the frequency domain. UL transmission and DL transmission occupy different frequency bands and can be simultaneously performed.

A superframe header (SFH) can carry an essential system parameter and system configuration information. The SFH may be located in a first subframe in a superframe. The SFH may occupy last 5 OFDMA symbols of the first subframe. The SFH can be classified into a primary-SFH (P-SFH) and a secondary-SFH (S-SFH). The P-SFH may be transmitted in every superframe. Information transmitted on the S-SFH can be divided into 3 sub-packets, i.e., S-SFH SP1, S-SFH SP2, and S-SFH SP3. Each sub-packet can be transmitted periodically with a different periodicity. Information transmitted through the S-SFH SP1, the S-SFH SP2, and the S-SFH SP3 may be different from one another. The S-SFH SP1 may be transmitted with the shortest period, and the S-SFH SP3 may be transmitted with the longest period. The S-SFH SP1 includes information on network re-entry, and a transmission period of the S-SFH SP1 may be 40 ms. The S-SFH SP2 includes information on initial network entry and network discovery, and a transmission period of the S-SFH SP2 may be 80 ms. The S-SFH SP3 includes other important system information, and a transmission period of the S-SFH SP3 may be either 160 ms or 320 ms.

One OFDMA symbol includes a plurality of subcarriers, and the number of subcarriers is determined according to a fast Fourier transform (FFT) size. There are several types of subcarriers. A subcarrier type may include a data subcarrier for data transmission, a pilot subcarrier for various estimations, and a null carrier for a guard band and a DC carrier. A parameter for characterizing an OFDMA symbol includes BW, $N_{used}$, n, G, etc. BW denotes a nominal channel bandwidth. $N_{used}$ denotes the number of subcarriers in use (including a DC subcarrier). n denotes a sampling factor. This parameter is used to determine a subcarrier spacing and a useful symbol time together with BW and $N_{used}$. G denotes a ratio of a CP time and a useful time.

Table 1 below shows an OFDMA parameter. The OFDMA parameter of Table 1 can equally apply to the 802.163 frame structure of FIG. 4

TABLE 1

| | | | | | | |
|---|---|---|---|---|---|---|
| Channel bandwidth, BW(MHz) | | 5 | 7 | 8.75 | 10 | 20 |
| Sampling factor, n | | 28/25 | 8/7 | 8/7 | 28/25 | 28/25 |
| Sampling frequency, $F_s$(MHz) | | 5.6 | 8 | 10 | 11.2 | 22.4 |
| FFT size, $N_{FFT}$ | | 512 | 1024 | 1024 | 1024 | 2048 |
| Subcarrier spacing, $\Delta f$(kHz) | | 10.94 | 7.81 | 9.77 | 10.94 | 10.94 |
| Useful symbol time $T_b$(μs) | | 91.4 | 128 | 102.4 | 91.4 | 91.4 |
| G = 1/8 | Symbol time, $T_s$(μs) | 102.857 | 144 | 115.2 | 102.857 | 102.857 |
| | FDD Number of ODFMA symbols per 5 ms frame | 48 | 34 | 43 | 48 | 48 |
| | Idle time(μs) | 62.857 | 104 | 46.40 | 62.857 | 62.857 |
| | TDD Number of ODFMA symbols per 5 ms frame | 47 | 33 | 42 | 47 | 47 |
| | TTG + RTG(μs) | 165.714 | 248 | 161.6 | 165.714 | 165.714 |
| G = 1/16 | Symbol time, $T_s$(μs) | 97.143 | 136 | 108.8 | 97.143 | 97.143 |
| | FDD Number of ODFMA symbols per 5 ms frame | 51 | 36 | 45 | 51 | 51 |
| | Idle time(μs) | 45.71 | 104 | 104 | 45.71 | 45.71 |
| | TDD Number of ODFMA symbols per 5 ms frame | 50 | 35 | 44 | 50 | 50 |
| | TTG + RTG(μs) | 142.853 | 240 | 212.8 | 142.853 | 142.853 |
| G = 1/4 | Symbol time, $T_s$(μs) | 114.286 | 160 | 128 | 114.286 | 114.286 |
| | FDD Number of ODFMA symbols per 5 ms frame | 43 | 31 | 39 | 43 | 43 |
| | Idle time(μs) | 85.694 | 40 | 8 | 85.694 | 85.694 |
| | TDD Number of ODFMA symbols per 5 ms frame | 42 | 30 | 38 | 42 | 42 |
| | TTG + RTG(μs) | 199.98 | 200 | 136 | 199.98 | 199.98 |
| Number of Guard subcarriers | Left | 40 | 80 | 80 | 80 | 160 |
| | Right | 39 | 79 | 79 | 79 | 159 |
| Number of used subcarriers | | 433 | 865 | 865 | 865 | 1729 |
| Number of PRU in type-1 subframe | | 24 | 48 | 48 | 48 | 96 |

In Table 1, $N_{FFT}$ is smallest power of two greater than $N_{used}$. A sampling factor $F_s$ is floor(n·BW/8000)×8000, a subcarrier spacing $\Delta f$ is $F_s/N_{FFT}$, a useful symbol time $T_b$ is $1/\Delta$, a CP time $T_g$ is $G·T_b$, an OFDMA symbol time $T_s$ is $T_b+T_g$, and a sampling time is $T_b/N_{FFT}$.

Hereinafter, a service flow (SF) will be described.

The SF is the concept of supporting quality of service (QoS). The SF denotes a media access control (MAC) transmission service for providing unidirectional packet transmission to a UL packet transmitted by an MS or a DL packet transmitted by a BS. The SF can be defined by a QoS parameter set such as latency, jitter, throughput assurance, etc. In addition, the SF can be defined by an attribute such as an SF ID (SFID), a connection ID (CID), a QoS parameter, an authorization module, etc. The SFID is allocated to each existing SF. The SFID functions as a principal identifier for an SF of an MS. The SF may have a direction related to at least one SFID. The CID is a connection ID of a transport connection that exists only when the SF is admitted or activated. The SFID and the CID may have a unique relation. The SFID cannot be related to one or more CIDs. The CID cannot be related to one or more CIDs.

The SF can be created, modified, or deleted. A DSA message creates a new SF. A DSC message modifies an existing SF. A DSD message deletes the existing SF. The DSA message, the DSC message, and the DSD message can be collectively referred to as a DSx message.

Figure 6:
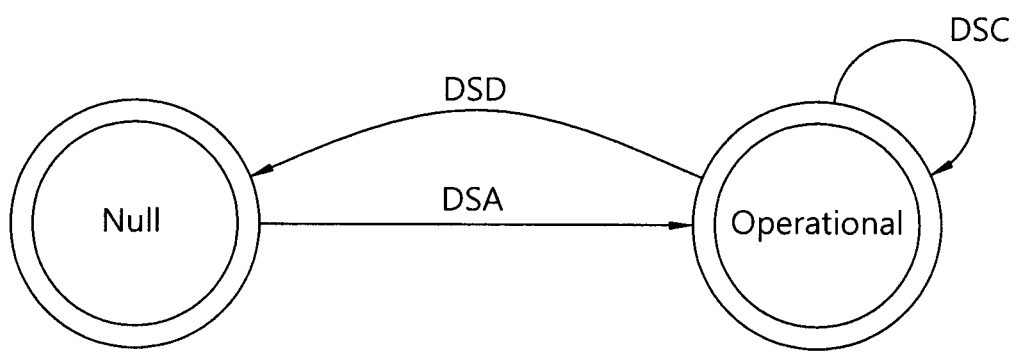
FIG. 6 shows creation, modification, or deletion of a dynamic service flow.

FIG. 6 shows creation, modification, or deletion of a dynamic SF. Referring to FIG. 6, a null state implies that there is no matched SFID and/or transaction ID in a message. If the SF exists one time, the SF is in an operational state, and the SF has an allocated SFID. The null state can be transitioned to the operational state by using a DSA message. That is, the SF can be created. In a steady-state operation, the SF is retained in a nominal state. The SF can be modified to another SF while remaining in the operational state by using a DSC message. The operational state can be transitioned to the null state by using a DSD message. That is, the SF can be deleted.

Table 2 shows an example of SF encoding. By encoding an SF, parameters related to UL/DL scheduling for the SF can be defined. Each parameter consists of a plurality of encapsulated type-length-value (TLV) fields.

TABLE 2

| Type | Parameter |
| --- | --- |
| 1 | SFID |
| ... | ... |
| 32 | Paging Preference |
| ... | ... |
| 99-113 | Convergence Sublayer Types |
| ... | ... |

In Table 2, a type-1 SFID parameter can be used by a BS according to a primary criterion of an SF in an MS. The SFID parameter may have a length of 4 bits. A type-32 paging preference parameter can indicate whether the SF creates paging. The paging preference parameter may have a length of 1 bit. If a value of the paging preference parameter is 0, paging may not be created. Otherwise, if the value of the paging preference parameter is 1, paging may be created.

A short message service (SMS) can be supported in an IEEE 802.16m system. The SMS can carry up to 140 bits. The SMS can also be supported in an IEEE 802.16p system. In particular, according to a characteristic of the M2M device, SMS transmission needs to be performed efficiently in the IEEE 802.16p system. Meanwhile, since the M2M device is expected to be in an idle mode at most times, there is a need for a method for effectively transmitting the SMS by the M2M device in the idle mode.

Hereinafter, the proposed data transmission method will be described. The present invention proposes a method of effectively transmitting an SMS while a specific SF is retained in an idle mode. According to the present invention, an SF necessary for SMS transmission can be retained without having to perform the entire signaling used for network entry of the M2M device in the idle mode. That is, according to the present invention, the M2M device in the idle mode does not need to create a new SF for SMS transmission.

According to the present invention, a new parameter for an SF can be defined as shown in Table 3.

TABLE 3

| Type | Parameter |
| --- | --- |
| 1 | SFID |
| ... | ... |
| 32 | Paging Preference |
| ... | ... |
| 99-113 | Convergence Sublayer Types |
| 114 | idle mode retain preference |
| ... | ... |

Referring to Table 3, a type-114 idle mode retain preference parameter is newly defined as a parameter for indicating whether an SF is retained in an idle mode. All SFs can be retained when entering the idle mode according to the conventional technique. However, in case of M2M communication, it is not necessary to retain all SFs. Therefore, according to the idle mode retain preference parameter of Table 3 defined by the present invention, it can be indicated whether an SF is retained in the process of creating the SF when entering the idle mode.

The idle mode retain preference parameter can be defined by Table 4 below.

TABLE 4

| Type | Length | Value | Scope |
| --- | --- | --- | --- |
| | 1 bit | indicate whether SF is retained when entering idle mode<br>0: no retention (default)<br>1: retention | DSx-REQ/RSP<br>DSx-ACK |

Referring to Table 4, when a value of the idle mode retain preference parameter is 0, a corresponding SF is not retained when entering the idle mode. When the value of the idle mode retain preference parameter is 1, the corresponding SF is retained when entering the idle mode. When the M2M device transmits an SMS in the idle mode by using the idle mode retain preference parameter, the SF can be retained without alternation. Alternatively, an SF of which a value of an idle mode retain preference parameter is 1 can be created and thus can be used only for SMS transmission of the M2M, and the SF can be retained even if entering the idle mode.

As the idle mode retain preference parameter is newly defined, what indicated by idle mode retain information can also change. The idle mode retain information can consist of 8 bits. According to whether each bit has a value of 0 or 1, it can be indicated whether a related re-entry management message is retained and managed. That is, if each bit has a value 0, it can be indicated that the re-entry management message is not retained and managed, and otherwise if each bit has a value 1, it can be indicated that the re-entry management message is retained and managed. When the idle mode retain preference parameter is defined, each bit of the idle mode retain information indicates the followings.

1) Bit 1: It indicates whether to retain an MS service related to a privacy key management request/response message (PKM-REQ/RSP message) and operational information. The M2M device can set a value of the bit 1 to 1 and thus can request the BS to retain a TEK even if entering the idle mode.

2) Bit 2: It indicates whether to retain an MS service related to a registration request/response message (REG-REQ/RSP message) and operational information.

3) Bit 6: It indicates whether to retain MS state information. In this case, SS basic capability (SBC) related information, privacy key management (PKM) related information, and registration (REG) related information are not included. According to a value of the bit 6, all SFIDs can be retained.

4) Bit 7: The bit 7 can be valid only when the bit 2 and the bit 6 have a value 1. If the bit 7 has a value 1, only MS state information of an SF that creates paging can be retained, or only MS state information of an SF retained by a newly defined idle mode retain preference parameter can be retained. If the bit 7 has a value 0, MS state information of all SFs can be retained.

When an SF for DL SMS transmission is created, a M2M device can set a value of a paging preference parameter to 1 to create an SF that activates a paging preference, or can set the value of the idle mode retain preference parameter to 1 to create an SF in which MS state information is retained when entering an idle mode. Alternatively, when an SF for UL SMS transmission is created, the M2M device can set the value of the idle mode retain preference parameter to 1 to create an SF in which MS state information is retained when entering the idle mode. Accordingly, the M2M device can transmit an SMS without having to create a new SF in the idle mode.

Figure 7:
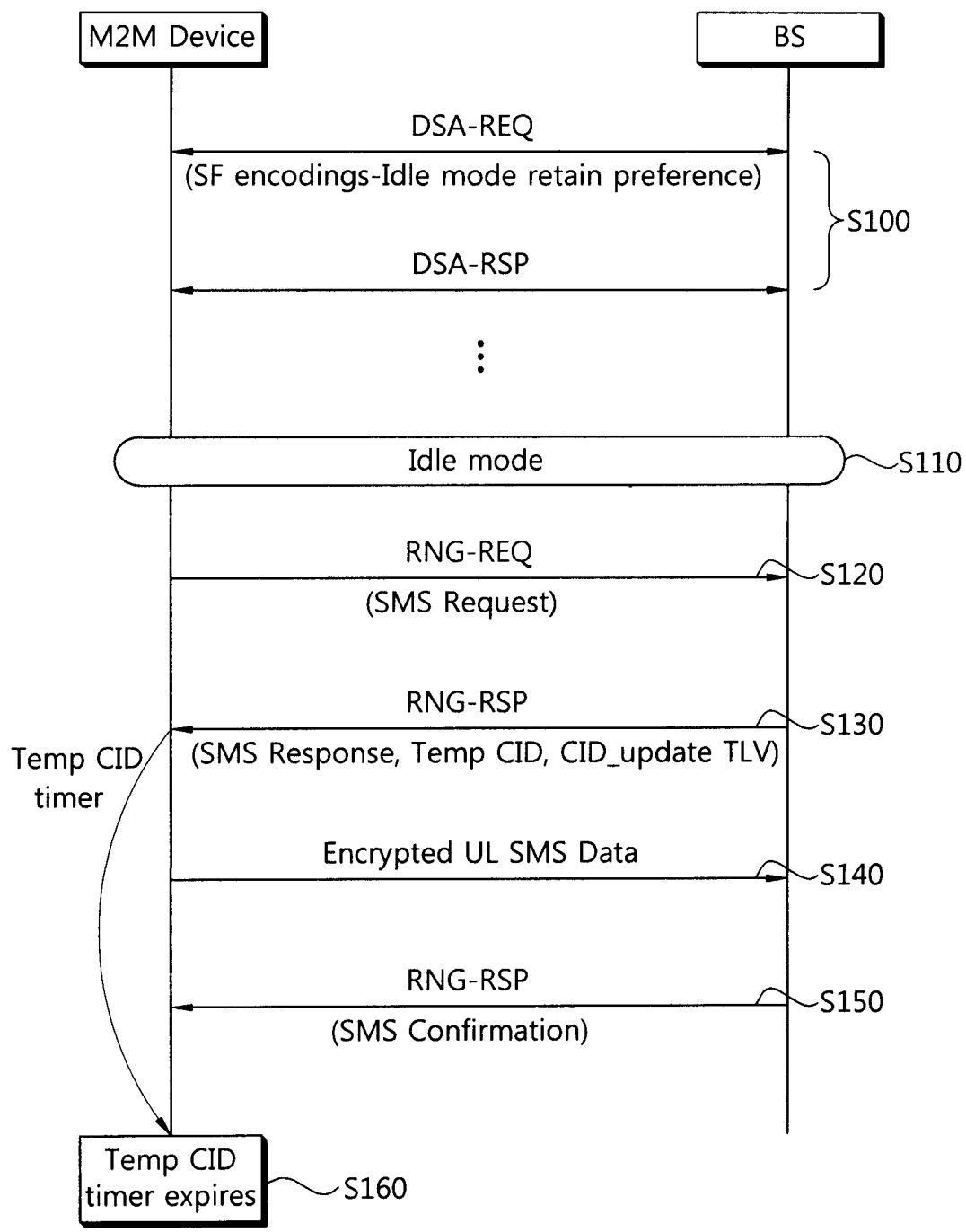
FIG. 7 shows the proposed data transmission method according to an embodiment of the present invention.

FIG. 7 shows the proposed data transmission method according to an embodiment of the present invention.

In step S100, an SF for transmission of a UL SMS is created. In step S110, a M2M device enters an idle mode.

The creation of the SF flow can be initiated by the M2M device. In this case, a dynamic service add request message (DSA-REQ message) is transmitted from the M2M device to a BS. A dynamic service add response message (DSA-RSP message) is transmitted from the BS to the M2M device. Alternatively, the creation of the SF can be initiated by the BS. In this case, the DSA-REQ message is transmitted from the BS to the M2M device. The DSA-RSP message is transmitted from the M2M device to the BS.

The idle mode retain preference parameter is defined when an SF is created, and a value of the idle mode retain preference parameter can be set to 1. Accordingly, an SF created for UL SMS transmission can be retained even in the idle mode, and the M2M device can transmit an SMS without having to create a new SF in the idle mode. In addition, bits 1, 2, 6, and 7 can be set to 1 in idle mode retain information. Accordingly, PKM related MS service and operational information, registration related MS service and operational information, and other MS state information can be retained.

In step S120, the M2M device transmits a range request message (RNG-REQ message) to a BS and thus reports to the BS that there is a UL SMS to be transmitted. The RNG-REQ message may include an SMS request parameter and a serving BSID. The serving BSID parameter indicates an ID of a BS to which the M2M device is finally connected.

Table 5 shows an example of a parameter that can be included in the RNG-REQ.

TABLE 5

| Name | Type | Length | Value | PHY scope |
|---|---|---|---|---|
| ... | ... | ... | ... | ... |
| M2M SMS Request | 24 | 1 | Bit 0-7: No. of bytes of SMS message | OFDMA |
| M2M SMS | 25 | Variable | M2M SMS message content up to 140 bytes Padding bits to align boundary of byte. | OFDMA |
| M2M SMS Confirmation | 26 | 1 | Bit 0: SMS confirmation 0—NACK 1—ACK Bit 1-7: Reserved | OFDMA |

In Table 5, a M2M SMS request parameter is an indicator for reporting that the M2M device desires to transmit a UL SMS to the BS. The M2M SMS parameter carries a UL M2M SMS message. The UL M2M SMS message may consist of up to 140 bytes. A M2M SMS confirmation parameter indicates whether the M2M device successfully receives an SMS when the DL SMS is transmitted from the BS.

In step S130, the BS transmits a ranging response message (RNG-RSP message) to the M2M device.

The RNG-RSP message may include an SMS response parameter, a temp transport CID, a temp CID, and a CID_update TLV. The SMS response parameter is an indicator for accepting SMS transmission of the M2M device. The temp transport CID can be used for encrypted SMS transmission. The temp transport CID and an SF retained when entering an idle mode can be mapped to each other by using the CID_update TLV. The temp CID is for allocation of a resource used for SMS transmission. The temp transport CID and the temp CID may be valid only during a temp CID timer is running. The RNG-RSP message can selectively include MS state information in an SF retained in the idle mode.

Table 6 shows an example of a parameter that can be included in the RNG-RSP message.

TABLE 6

| Name | Type | Length | Value | PHY scope |
|---|---|---|---|---|
| ... | ... | ... | ... | ... |
| M2M SMS Response | 41 | 1 | Bit 0-1: accept or reject SMS request 0b0: reject 0b1: accept If(reject){ Bit 2-3: action code 0b00: network re-entry 0b01-0b11: reserved } else { Reserved } Bit 4-7: Reserved | OFDMA |
| Temp CID Timer | 42 | 1 | Life time duration for the Basic CID assigned by BS | OFDMA |
| M2M SMS Confirmation | 43 | 1 | Bit 0: SMS confirmation b0—NACK b1—ACK Bit 1-7: Reserved | OFDMA |
| M2M SMS | 44 | Variable | M2M SMS message content up to 140 bytes Padding bits to align boundary of byte. | OFDMA |

In Table 6, a M2M SMS response parameter is an indicator for reporting that the M2M device accepts UL SMS transmission. A temp CID timer parameter indicates a time in which a temp CID and/or a temp transport CID are valid. Meanwhile, the temp CID may be equal to a basic CID, and the basis CID is used to allocate a resource for transmitting a UL SMS by the M2M device. A M2M SMS confirmation parameter indicates whether the BS successfully receives a UL SMS when the M2M device transmits the UL SMS at a later time. The M2M SMS parameter carries a DL M2M SMS message. The DL M2M SMS message may consist of to 140 bytes.

In step S140, the M2M device transmits an encrypted UL SMS to the BS. Since a bit 1 is set to 1 in the idle mode retain information, PKM related MS service and operational information is retained, and an SF retained in the idle mode and the temp transport CID are mapped by using the CID update TLV. Accordingly, the UL SMS can be encrypted.

In step S150, the BS transmits the RNG-RSP message to the M2M device, and thus reports to the M2M device that the UL SMS is received.

In step S160, the temp CID timer expires.

As described above, according to the proposed data transmission method, the M2M device can operate as if a UL SMS is transmitted by performing optimized network re-entry. The M2M device performs an operation similar to the optimized network re-entry in a sense that the temp transport CID or the like is allocated, except that a new SF is not created. Accordingly, the M2M device can effectively transmit the UL SMS even in the idle mode. Meanwhile, since the M2M device operates in the idle mode, there is no need to re-enter the idle mode after the temp CID timer expires.

Figure 8:
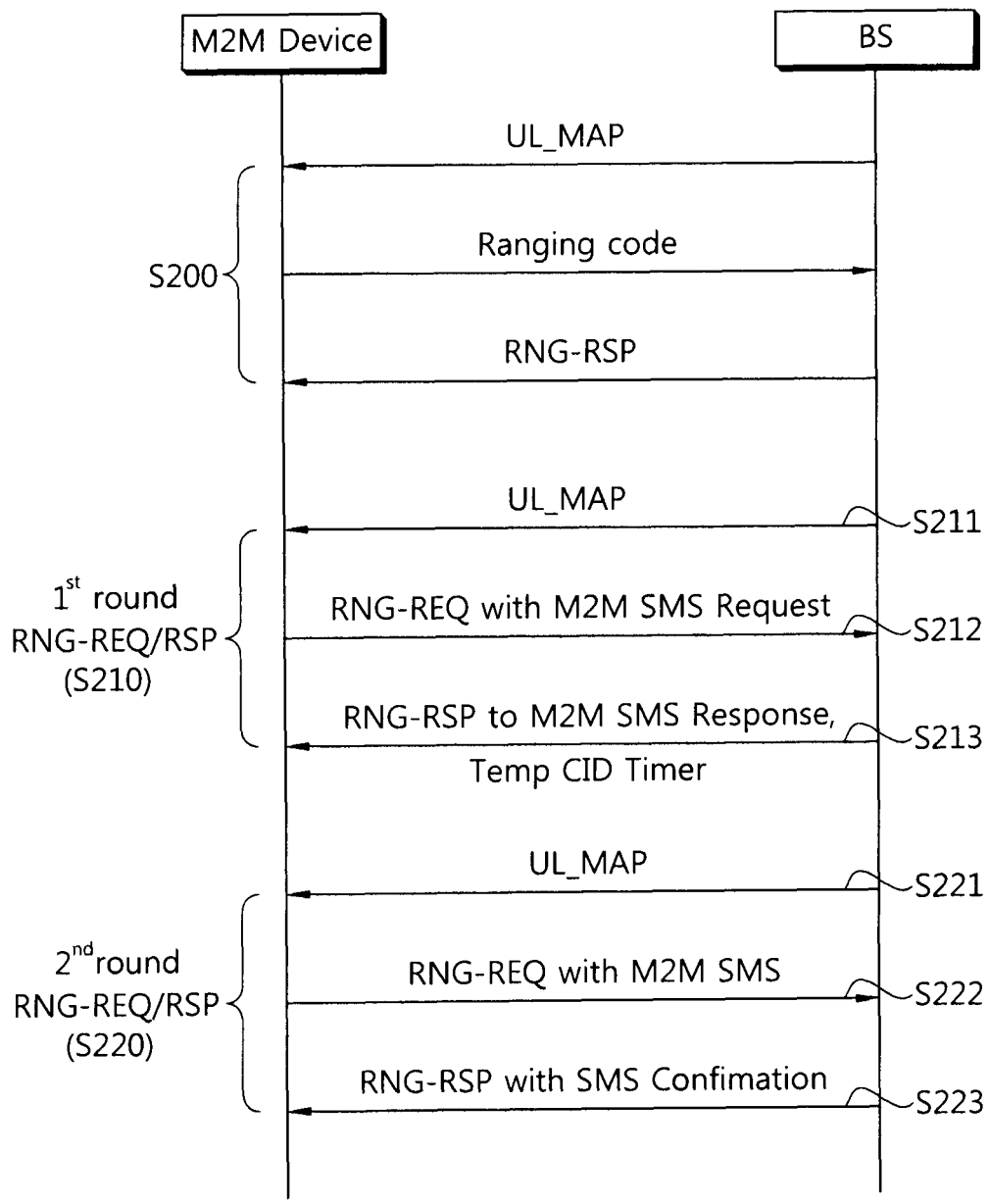
FIG. 8 shows the proposed data transmission method according to another embodiment of the present invention.

FIG. 8 shows the proposed data transmission method according to another embodiment of the present invention.

In step S200, a M2M device performs ranging on a BS. The BS transmits UL-MAP to the M2M device. The M2M device transmits a ranging code to the BS. The BS transmits an RNG-RSP message to the M2M device, and thus finishes the ranging.

In order for the M2M device to transmit the UL SMS, an RNG-REQ/RSP message exchange process can be performed in two steps.

In step S210, a first step of the RNG-REQ/RSP message exchange process is shown. In step S211, the BS transmits UL-MAP to the M2M device. In step S212, the M2M device transmits an RNG-REQ message including a M2M SMS request parameter to the BS, and thus reports that there is the UL SMS to be transmitted. When the BS successfully receives the RNG-REQ message including the M2M SMS request parameter, the BS can determine whether to accept UL SMS transmission. In step S213, the BS determines whether to accept UL SMS transmission, and transmits an RNG-RSP message including a M2M SMS response parameter to the M2M device. The M2M SMS response parameter includes an action code regarding an action of the M2M device according to whether the UL SMS transmission is accepted. When the BS accepts the UL SMS transmission, the RNG-RSP message includes a basis CID and a temp CID timer used for resource allocation for the UL SMS transmission. Meanwhile, in case of a fixed M2M device, the RNG-REQ message transmitted in step S212 may include information regarding location update, and paging related parameters may not be included to reduce a signaling overhead. This is because the BS knows mobility related information of the M2M device.

In step S220, a second step of the RNG-REQ/RSP message exchange process is shown. If the BS does not accept UL SMS transmission, the M2M device operates according to an action code indicated by the BS. Otherwise, if the BS accepts UL SMS transmission, the BS transmits UL-MAP to the M2M device in step S221. The UL-MAP may include bandwidth allocation for an RNG-REQ message to be transmitted by the M2M device. In this case, the bandwidth allocation can be allocated based on a basic CID transmitted by the BS. In step S222, the M2M device transmits the RNG-REQ message including a M2M SMS parameter to the BS. When the BS successfully receives the UL SMS, the BS can transmit the RNG-RSP message including a M2M SMS confirmation parameter to the M2M device in step S223. The basic CID is released when the M2M device finally receives the M2M SMS confirmation parameter or when the temp CID timer expires.

In the data transmission method of FIG. 8, if the M2M device recognizes that the allocated bandwidth is enough to transmit a UL SMS by piggybacking the UL SMS on the RNG-REQ message, the first step of the RNG-REQ/RSP exchange process can be skipped.

Meanwhile, an SMS transmission method using a counter based traffic encryption KEY (TEK) generation method can be proposed to ensure SMS encryption. According to the proposed method, each of the BS and the M2M device pre-updates a TEK and performs ranging to establish synchronization, and thereafter transmits an encrypted SMS.

Figure 9:
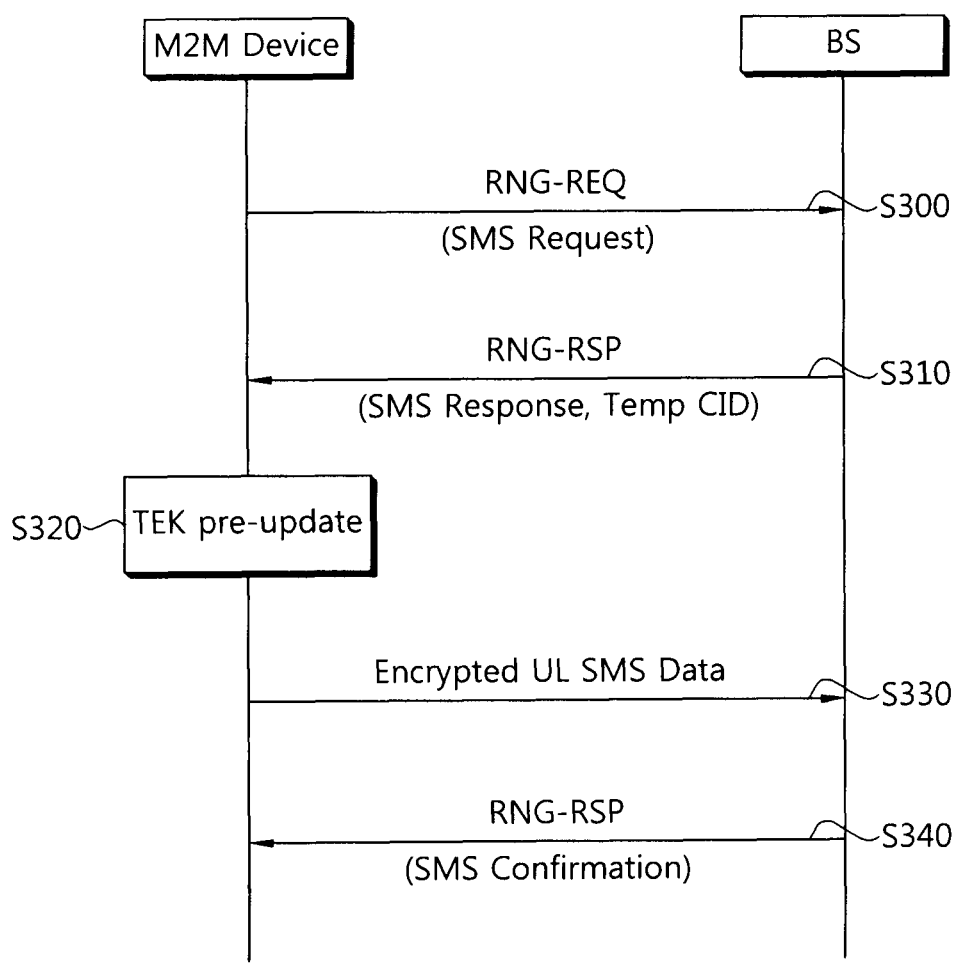
FIG. 9 shows the proposed data transmission method according to another embodiment of the present invention.

FIG. 9 shows the proposed data transmission method according to another embodiment of the present invention.

In step S300, a M2M device transmits an RNG-REQ message including a M2M SMS request parameter to a BS. Accordingly, the M2M device can report to the BS that there is a UL SMS to be requested.

In step S310, the BS transmits an RNG-RSP message including a M2M SMS response parameter to the M2M device in response to the RNG-REQ message. The BS can determine whether to accept UL SMS transmission. When the BS does not accept UL SMS transmission, the M2M device operates according to an action code indicated by the BS through the RNG-RSP message. The M2M device can attempt re-entry after backoff.

When the BS accepts UL SMS transmission, the RNG-RSP message includes a temp CID. The temp CID is used to allocate a UL resource for transmitting a UL SMS and an acknowledgement (ACK)/non-acknowledgement (NACK) message during a temp CID timer is running. In addition, a TEK lifetime value can be included in the RNG-RSP message, and thus a lifetime of the generated TEK can be updated.

In step S320, the M2M device and the BS pre-update a TEK by performing counter based TEK generation. The counter based TEK generation method can refer to the section 7.2.2.2.6.1 of IEEE Std 802.16TM-2009 (Revision of IEEE Std 802.16-2004). The TEK can be generated by Equation 1.

$$TEKi=Dot16KDF(KEK\_prime, CMAC\_KEY\_COUNT\_T|SAID|\text{"TEK}i\text{ Generation}",128) \qquad \text{<Equation 1>}$$

In Equation 1, KEK_prime=Dot16KDF (KE, "KEK for TEk Generation", 128) can be calculated, and CMAC_KEY_COUNT_T denotes CMAC-KEY_COUNT for traffic.

The RNG-REQ message received by the BS in step S300 may include CMAC_KEY_COUNT TLV. If a CMAC_KEY_COUNT value received by the BS is different from a stored value, the BS updates it to the received CMAC_KEY_COUNT value and then can re-generate the TEK.

In step S330, the M2M device transmits an encrypted UL SMS to the BS. A UL resource can be allocated to the M2M device by using the temp CID. The M2M device can transmit the encrypted UL SMS by using the pre-updated TEK.

In step S340, the BS transmits the RNG-RSP message including a M2M SMS confirmation parameter to the M2M device.

Figure 10:
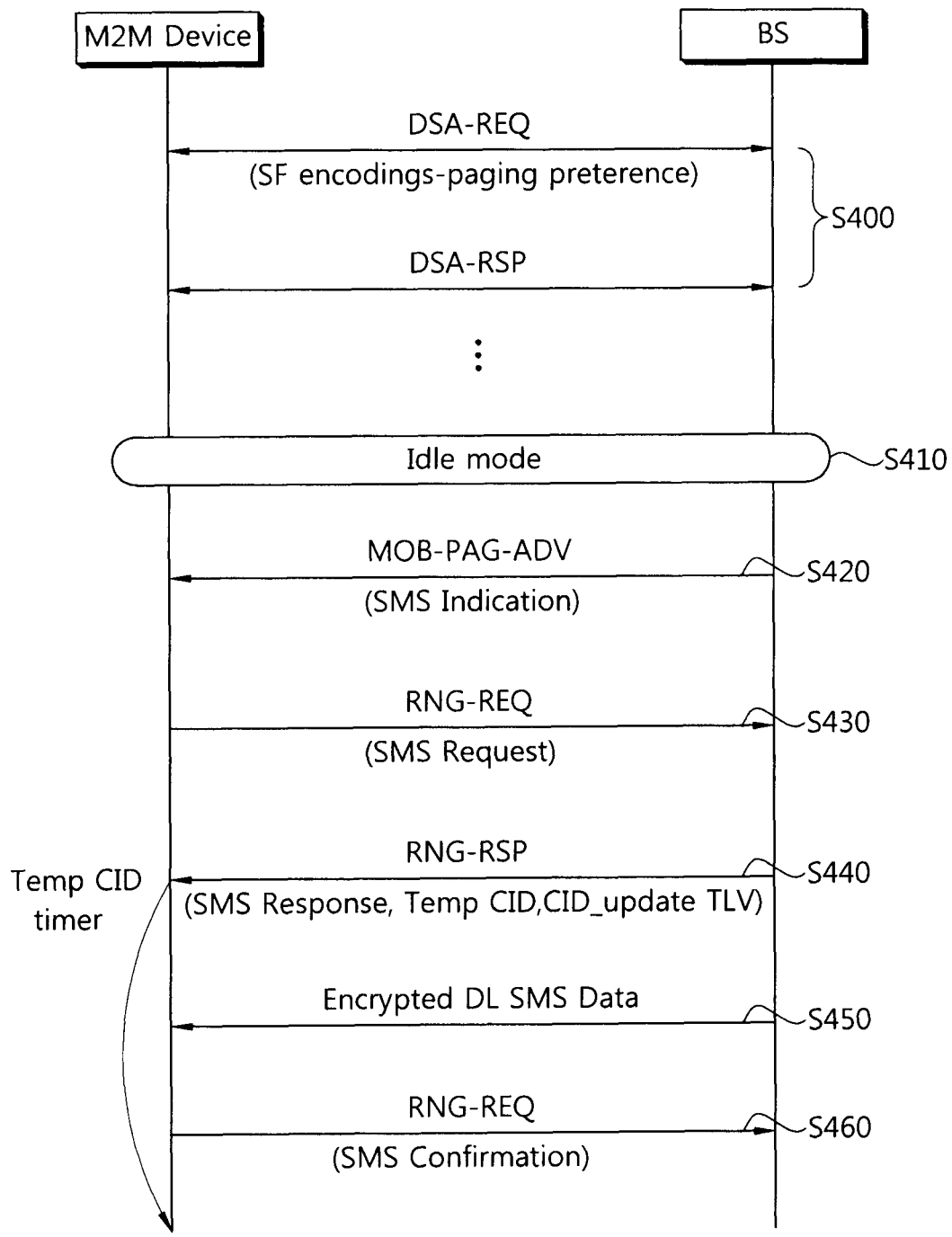
FIG. 10 shows the proposed data transmission method according to another embodiment of the present invention.

FIG. 10 shows the proposed data transmission method according to another embodiment of the present invention.

In step S400, an SF for DL SMS transmission is created. In step S410, a M2M device enters an idle mode. The creation of the SF can be initiated by the M2M device or may be initiated by a BS. When the SF is created, a value of a paging preference parameter can be set to 1. Accordingly, the SF created for DL SMS transmission can be retained even in the idle mode, and the M2M device can transmit an SMS without having to create a new SF in the idle mode. In addition, bits 1, 2, 6, and 7 can be set to 1 in idle mode retain information. Accordingly, PKM related MS service and operational information, registration related MS service and operational information, and other MS state information can be retained.

In step S420, the BS transmits a broadcasting paging message (MOB-PAG-ADV message) to the M2M device, and thus indicates that there is a DL SMS to be transmitted.

In step S430, the M2M device transmits an RNG-REQ message to the BS, and thus requests transmission of the DL SMS. The RNG-REQ message can include the M2M SMS request parameter among the parameters of Table 5.

In step S440, the BS transmits an RNG-RSP message to the M2M device. The RNG-RSP message may include an SMS response parameter, a temp transport CID, a temp CID, and a CID_update TLV. The temp transport CID can be used for encrypted SMS transmission. The temp transport CID and an SF retained when entering an idle mode can be mapped to each other by using the CID_update TLV. The temp CID is for allocation of a resource used for SMS transmission. The temp transport CID and the temp CID may be valid only during a temp CID timer is running. The RNG-RSP can selectively include MS state information in an SF retained in the idle mode.

In step S450, the BS transmits an encrypted DL SMS to the BS. Since a bit 1 is set to 1 in the idle mode retain information, PKM related MS service and operational information is retained, and an SF retained in the idle mode and the temp transport CID are mapped by using the CID update TLV. Accordingly, the DL SMS can be encrypted.

In step S460, the BS transmits the RNG-RSP message to the M2M device, and thus reports to the M2M device that the DL SMS is received. The RNG-RSP message can include the M2M SMS confirmation parameter among the parameters of Table 6.

Figure 11:
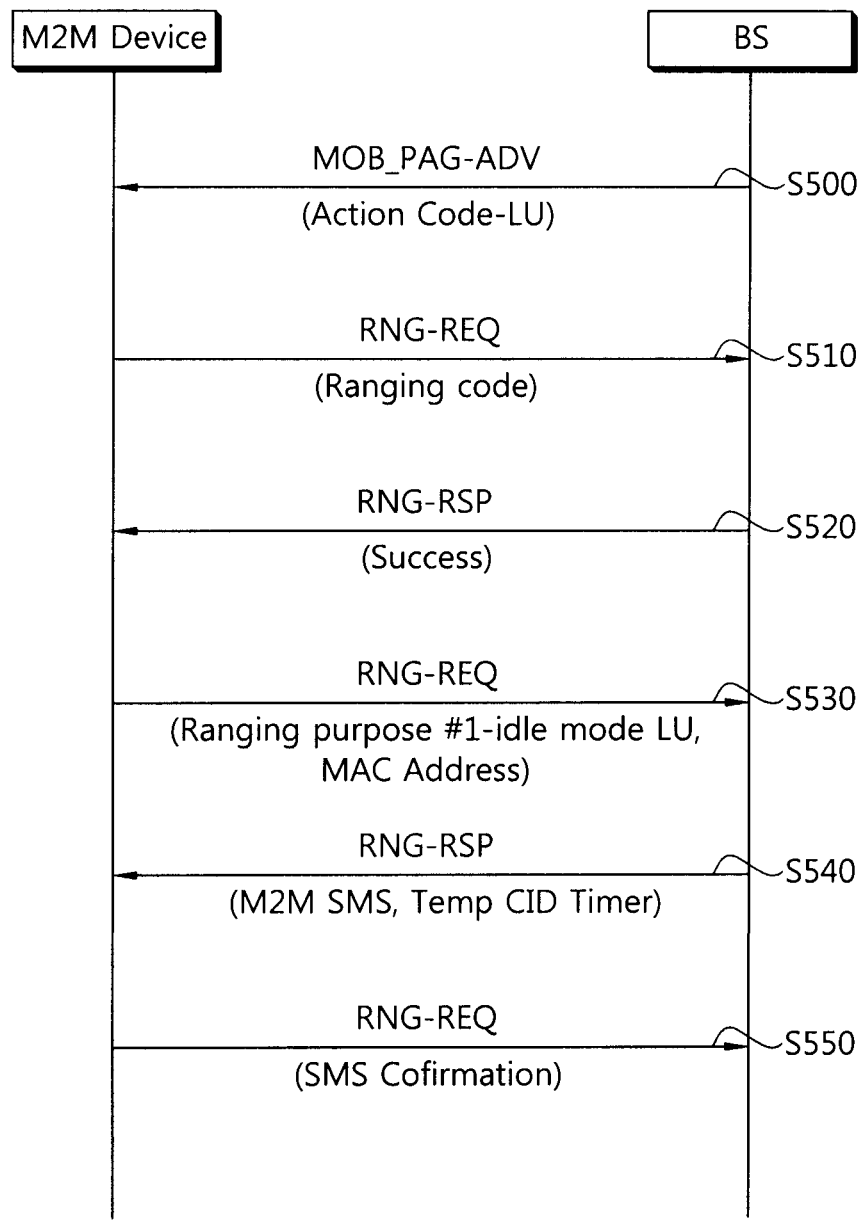
FIG. 11 shows the proposed data transmission method according to another embodiment of the present invention.

FIG. 11 shows the proposed data transmission method according to another embodiment of the present invention.

In step S500, a BS transmits an MOV-PAG-ADV message to a M2M device. In this case, an action code of the MOV-PAG-ADV message can indicate location update.

In step S510, the M2M device transmits an RNG-REQ message including a ranging code to the BS. In step S520, the BS transmits an RNG-RSP message including a response thereto to the M2M device, and thus finishes ranging.

In step S530, the M2M device transmits the RNG-REQ message to the BS. In step S540, the BS transmits the RNG-RSP message including a M2M SMS parameter, a basic CID, and a temp CID timer to the M2M device. Upon receiving the RNG-RSP message, the M2M device may wait for bandwidth allocation for RNG-REQ message transmission.

In step S550, the M2M device transmits the RNG-REQ message including a M2M SMS confirmation parameter to the BS.

Meanwhile, when transmitting the DL SMS, it is also possible to propose an SMS transmission method using a counter based TEK generation method to ensure DL SMS encryption.

Figure 12:
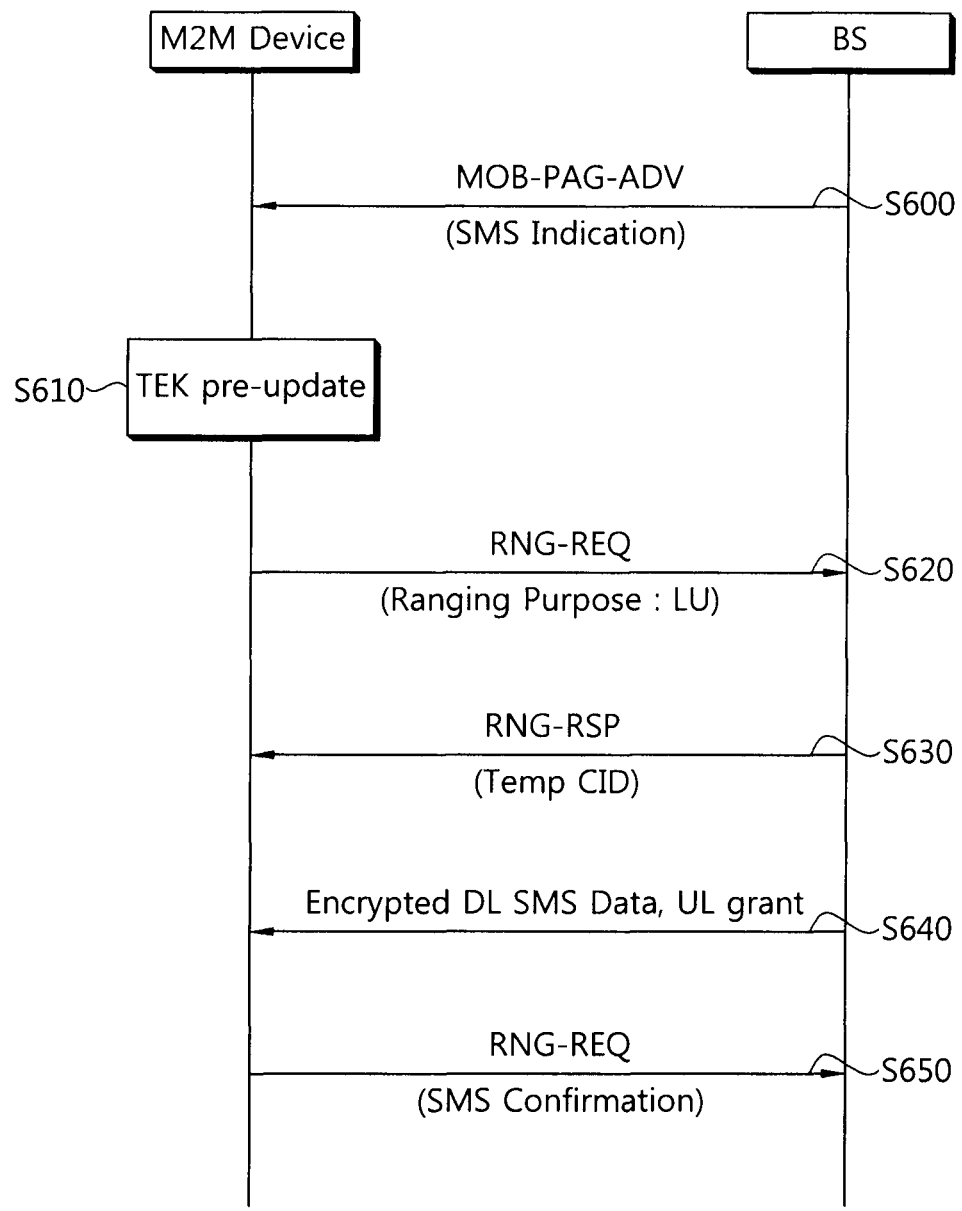
FIG. 12 shows the proposed data transmission method according to another embodiment of the present invention.

FIG. 12 shows the proposed data transmission method according to another embodiment of the present invention.

In step S600, a BS transmits an MOB-PAG-ADV message to a M2M device and thus reports that there is a DL SMS to be transmitted.

In step S610, the M2M device and the BS pre-update a TEK by using a counter based TEK generation method. The counter based TEK generation method can refer to the section 7.2.2.2.6.1 of IEEE Std 802.16TM-2009 (Revision of IEEE Std 802.16-2004). The TEK can be generated by Equation 1.

In step S620, the M2M device transmits an RNG-REQ message to the BS. In this case, an action code may be location update. In step S630, the BS transmits an RNG-RSP message including a temp CID to the M2M device. The temp CID is used in resource allocation for DL SMS transmission. In addition, the RNG-RSP message may include a TEK lifetime value.

In step S640, the BS transmits an encrypted DL SMS to the M2M device. A DL resource is allocated to the BS on the basis of the allocated temp CID. The BS can transmit the encrypted DL SMS by using the generated TEK.

In step S650, the M2M device transmits the RNG-REQ message including a M2M SMS confirmation parameter to the BS.

Figure 13:
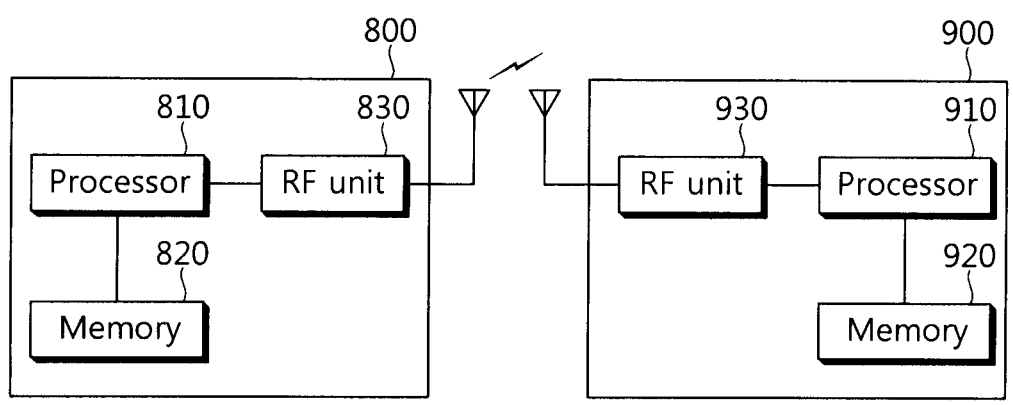
FIG. 13 is a block diagram showing wireless communication system to implement an embodiment of the present invention.

FIG. 13 is a block diagram showing wireless communication system to implement an embodiment of the present invention.

A BS 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An M2M device 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the present invention, a machine-to-machine (M2M) device can reliably transmit a short message service (SMS) while minimizing a signaling overhead.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of transmitting data by a machine-to-machine (M2M) device in a wireless communication system, the method comprising:

transmitting a first ranging request message to a base station, the first ranging request message including an M2M short message service (SMS) request, indicating that the M2M device has an M2M SMS to transmit, if allocated bandwidth is not sufficient for piggybacking an M2M SMS in a ranging request message during network reentry;

receiving a first ranging response message from the base station, the first ranging response message including an M2M SMS response which corresponds to the M2M SMS request and informs the M2M device whether the M2M SMS request is accepted or not;

transmitting a second ranging request message to the base station if the M2M SMS request is accepted by the base station, the second ranging request message including the M2M SMS; and receiving a second ranging response message from the base station, the second ranging response message including an M2M SMS confirmation indicating whether the reception of the M2M SMS is successful or not by the base station.

2. The method of claim 1, wherein the M2M SMS request indicates the number of bytes of the M2M SMS.

3. The method of claim 1, wherein the M2M SMS is transmitted based on a service flow which is retained in idle mode.

4. The method of claim 3, wherein the service flow is retained based on an idle mode retain preference parameter defined when the service flow is created.

5. The method of claim 4, wherein a value of the idle mode retain preference parameter is 1.

6. The method of claim 3, wherein the first ranging response message includes a temporary transport CID and a CID update type-length-value (TLV), the CID update TLV indicating information on mapping between the service flow and the temporary transport CID.

7. A machine-to-machine (M2M) device in a wireless communication system, the M2M device comprising:

a radio frequency (RF) unit for transmitting and receiving a radio signal; and a processor, coupled to the RF unit, and configured for:

transmitting a first ranging request message to a base station, the first ranging request message including an M2M short message service (SMS) request, indicating that the M2M device has an M2M SMS to transmit, if allocated bandwidth is not sufficient for piggybacking an M2M SMS in the ranging request message during network reentry;

receiving a first ranging response message from the base station, the first ranging response message including an M2M SMS response which corresponds to the M2M SMS request and informs the M2M device whether the M2M SMS request is accepted or not;

transmitting a second ranging request message to the base station if the M2M SMS request is accepted by the base station, the second ranging request message including the M2M SMS; and receiving a second ranging response message from the base station, the second ranging response message including an M2M SMS confirmation indicating whether the reception of the M2M SMS is successful or not by the base station.

* * * * *